No. 874,263. PATENTED DEC. 17, 1907.
G. UNZNER.
PROPELLING APPARATUS.
APPLICATION FILED JULY 5, 1907.

WITNESSES
Geo Schwarz.
Johanne Daumberger.

INVENTOR
Gustav Unzner
BY
Mark W. Ordmann
ATTORNEY

No. 874,263.  
PATENTED DEC. 17, 1907.  
G. UNZNER.  
PROPELLING APPARATUS.  
APPLICATION FILED JULY 5, 1907.  
8 SHEETS—SHEET 3.

WITNESSES  
INVENTOR  
ATTORNEY

No. 874,263. PATENTED DEC. 17, 1907.
G. UNZNER.
PROPELLING APPARATUS.
APPLICATION FILED JULY 5, 1907.

WITNESSES
INVENTOR
ATTORNEY

No. 874,263. PATENTED DEC. 17, 1907.
G. UNZNER.
PROPELLING APPARATUS.
APPLICATION FILED JULY 5, 1907.

WITNESSES

INVENTOR

ATTORNEY

UNITED STATES PATENT OFFICE.

GUSTAV UNZNER, OF NEW YORK, N. Y.

PROPELLING APPARATUS.

No. 874,263.

Specification of Letters Patent.

Patented Dec. 17, 1907.

Application filed July 5, 1907. Serial No. 382,203.

*To all whom it may concern:*

Be it known that I, GUSTAV UNZNER, a subject of the German Emperor, and a resident of New York, county and State of New York, have invented certain new and useful Improvements in Propelling Apparatus, of which the following is a specification.

The present invention pertains to a propelling apparatus which can be utilized as a flying machine or can be suspended from a balloon and consists in the arrangement of vertical sets of horizontally reciprocating paddles or wings of which each, at the end of its reciprocating movement, is capable of being reversed from vertical into horizontal position and vice versa.

By the rapid horizontal movement of the wings in vertical position, the apparatus will be propelled forward, the wings being so arranged that when in horizontal position, the entire set at either side of the frame to which they are attached, will form an almost uninterrupted vast surface, which, during the horizontal movement thereof, will cause a high compression of the air whereby the apparatus will be rapidly thrust forward.

The apparatus is preferably divided in two horizontal sections, in each of which horizontal worm spindles with reversed thread are rotatively mounted. Each worm spindle carries, by means of a peculiarly constructed nut, a frame that is capable of being fed along the same, and that at each end is provided with such vertical set of wings. Owing to the reversed thread, the wings in one section will be caused to move in opposite direction to those in the other section. Furthermore, while in one section, the wings move in vertical position propelling the apparatus, those in the other section move in horizontal position not impairing the propelling movement of the apparatus and assume a vertical position as soon as the first named wings are reversed into horizontal position. Continuing thus to alternately change their position from vertical into horizontal and vice versa while moving rapidly forward and backward, the wings will permit the apparatus of propelling itself in the air in the fashion of a bird.

In order to allow of the steering of the apparatus, I provide means whereby I am enabled at any desired moment, to adjust the apparatus so as to cause the wings to swing in reversed direction from one position into the other.

Similarly to the horizontal sections, I arrange at each end of the frame two vertical sections in which vertical worm spindles with reversed thread are rotatively mounted, carrying vertically reciprocating frames in which horizontal sets of wings, of similar construction as those in the horizontal sections, are provided. These wings, likewise, are capable of swinging from vertical into horizontal position, and are designed to propel the apparatus upward and downward. The operation of these vertically reciprocating wings is similar to those of the horizontally reciprocating wings.

When the propelling apparatus is suspended from a balloon, the vertically reciprocating wings may be dispensed with, and for this purpose the vertical worm spindles may be provided with suitable couplings to allow of the same being easily thrown out of gear. If, however, desired, these vertically reciprocating wings can be utilized for ascending or descending, and the same will thus dispense with the necessity of carrying ballasts to be thrown out when the machine is to ascend.

In case of the motor being out of order, the wings in the horizontal and vertical sections may all be brought into horizontal position so as to act as a parachute which will prevent the apparatus from sinking too rapidly.

One of the main features of my invention, is the means whereby the reciprocating frames in the horizontal and vertical sections of the apparatus are caused to rapidly move along the worm spindle, and whereby the friction between the moving parts is reduced to a minimum. Owing to this feature, only very small power is necessary for propelling the apparatus.

According to the size of the machine, the number of wings in each set may be varied. It is evident that the longer the worm spindles, the more effective will be the apparatus.

To make my invention more clear, the same is illustrated in the accompanying drawings, in which similar reference letters denote corresponding parts, and in which Fig. 1ª is a top plan view of the propelling apparatus; Figs. 7, 8, 9, 10, 11, 12, 13 and 14 show details of construction.

Figure 1:
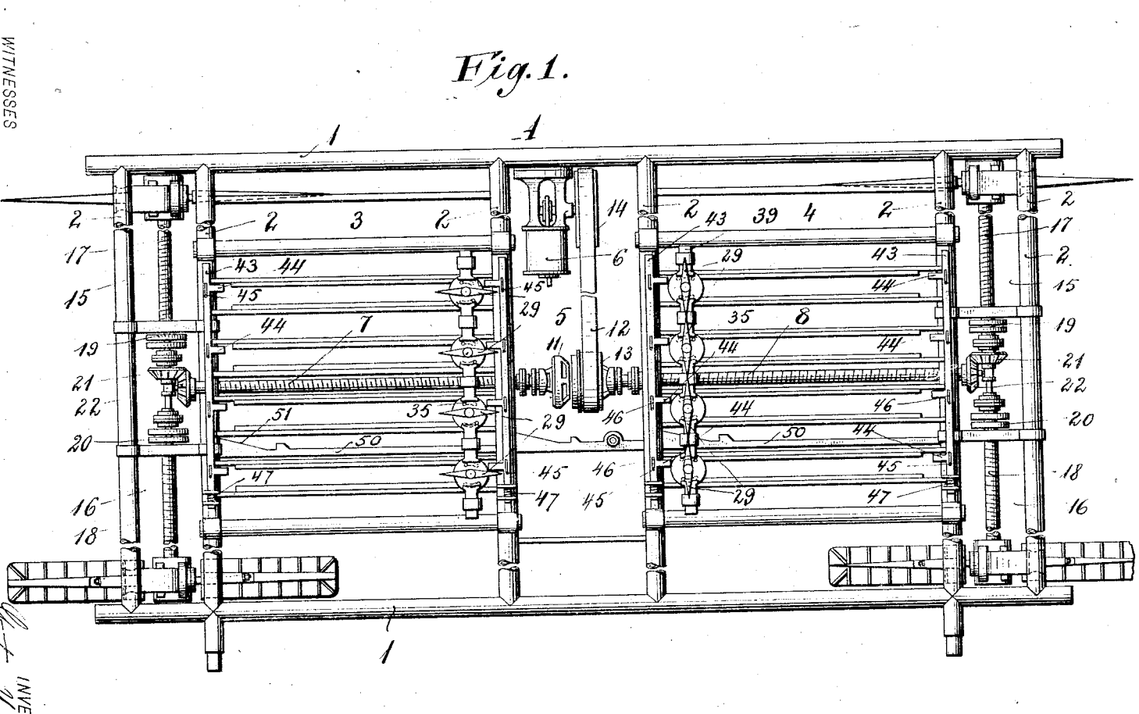
Figure 1 is a side view.
Figure 1A:
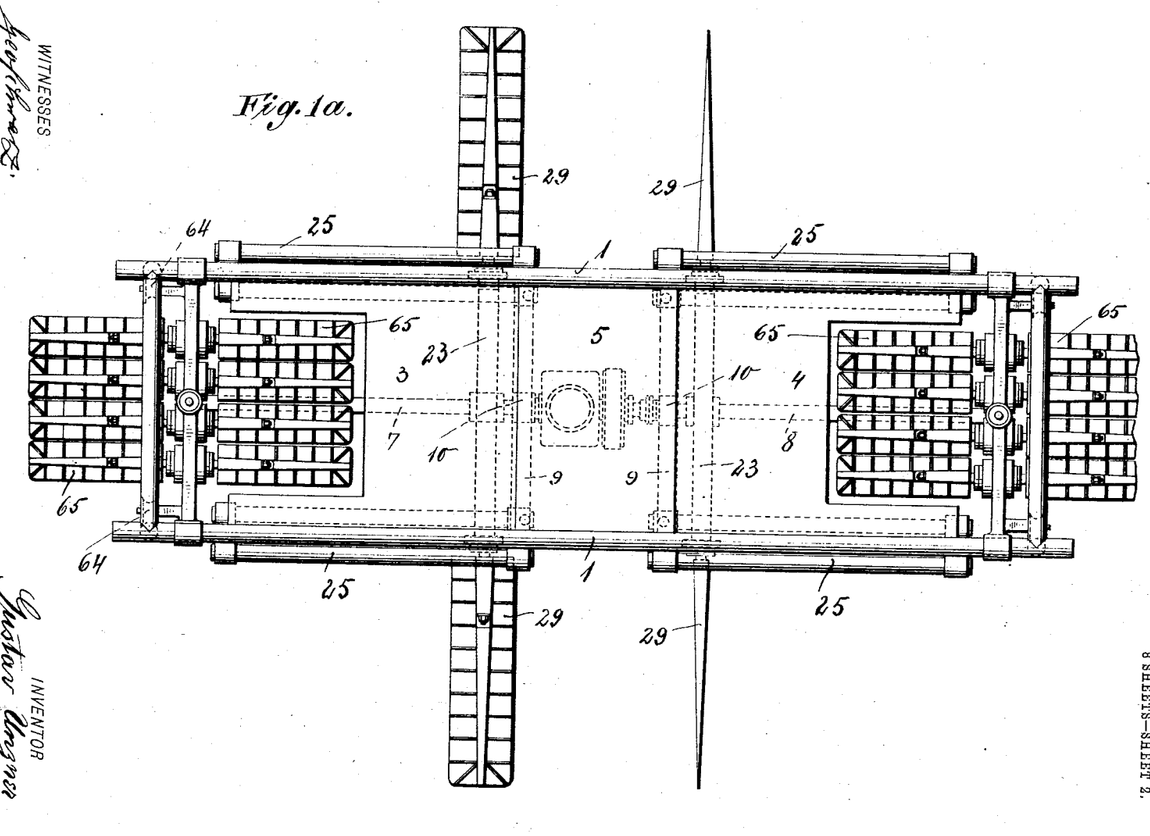
Figure 2:
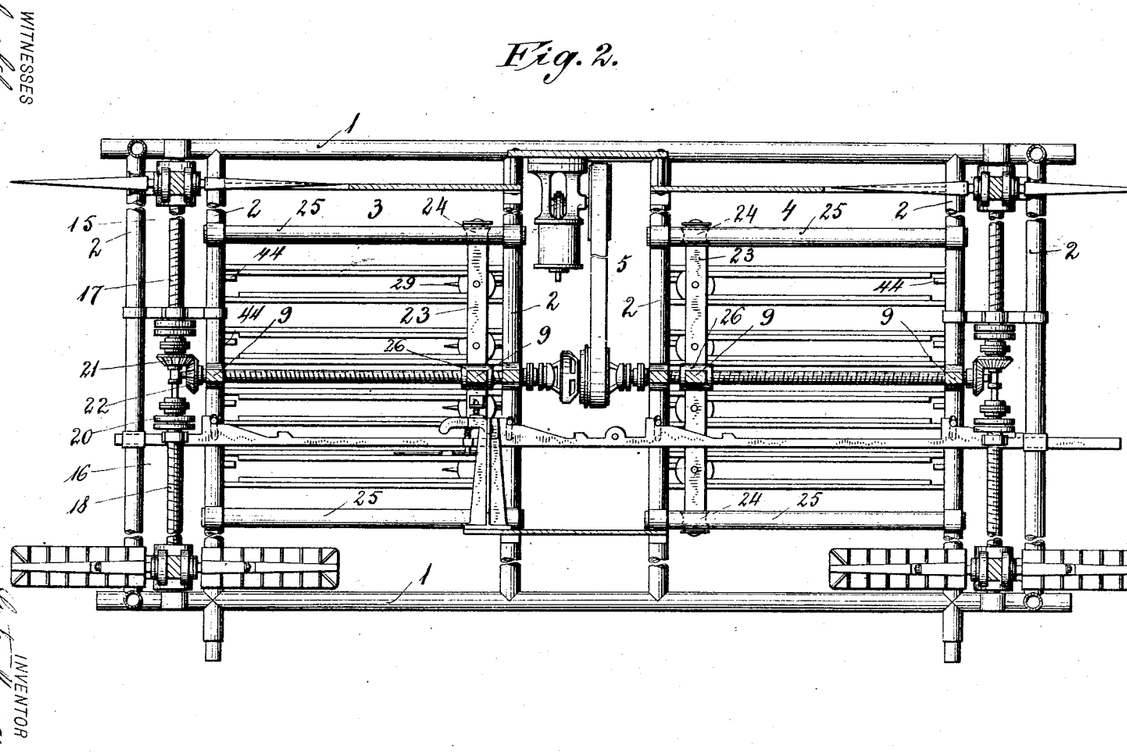
Fig. 2 a vertical longitudinal section.

My apparatus consists of a rectangular frame A composed of horizontal and vertical tubes 1 and 2 and is divided into two sections 3 and 4, the left and right hand sections, there being formed a space 5 between the two sections for the accommodation of a suitable motor 6 and transmission means. Extending centrally and longitudinally through each section of the rectangular frame are worm spindles 7, 8 with reversed threads, these spindles being each supported in cross bars 9 (Figs. 2 and 4) by means of suitable ball bearings 10 indicated by dotted lines in Fig. 1ª. Both spindles are connected by a suitable coupling 11 and may be driven from the motor by a transmission belt 12 guided over a pulley 14, and a countershaft pulley 13 of any suitable construction which is to allow of the spindles being alternately driven in one and the other direction.

At each end of the frame, two vertical sections 15, 16 are arranged in which similarly to the horizontal spindles vertical spindles 17, 18 are mounted in ball bearings and are driven from the horizontal spindles by means of cog wheels 21, 22. 19, 20 denote couplings whereby the vertical spindles can be readily coupled with one another and with the horizontal spindles.

In each of the horizontal sections 3 and 4 of the frame, a reciprocating H-shaped frame 23 (Figs. 2 and 3) is arranged which is mounted on the horizontal spindle to be horizontally fed along the latter and which carries at its four ends, guide rolls 24 that run between longitudinal guide tubes 25 suitably secured to the frame and that serve to guide the frame 23 in its longitudinal movement.

To allow of a forward and backward feeding of the frame 23 along the horizontal spindle, the same is provided at its center with a sleeve 26 (Fig. 9) which closely fits around the thread of the spindle and in which balls 27 borne between the thread and the sleeve are inclosed. These balls are secured in position by set screws 28 working in oblique bores made in the sleeve 26. The sleeve together with the balls thus forms a nut for the frame 23 whereby, during rotation of the spindles, the frame will be caused to move in horizontal direction.

To each side of the frame 23 a vertical set of wings or paddles 29 are secured which serve for the purpose of propelling the apparatus forward and backward. These wings 29 are so constructed as to be capable of being reversed from the vertical into horizontal position at the ends of the reciprocating movement of the frame, the arrangement being such, that while one set of paddles in one section of the frame are in horizontal position, the paddles in the other section of the frame are in vertical position and vice versa, and that while the frame 23 carrying said paddles in the section 3 moves forward, the frame in the other section 4 moves in opposite direction. Owing to the ball bearing of the frame 23 that serves as a nut for the spindle, the frame will move with great ease along the latter, the friction being reduced to a minimum.

Figure 8:
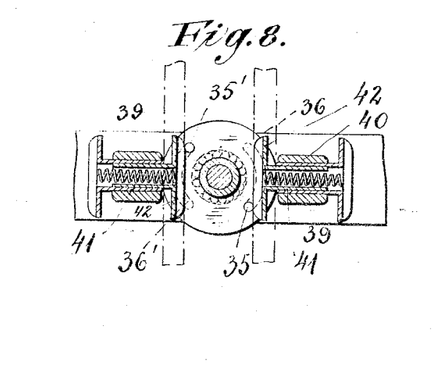

The attachment of the paddles to the side bars of the frame 23 is attained in the following manner: Each paddle is provided with a hollow cylindrical neck 30 which at its rear end is formed to a circular disk 31. Borne and secured within the neck 30 is a bolt 32 which projects outward from said neck and is secured in the side bar of the frame 23. Between the side bar of the frame and the circular disk 31 a disk 33 is arranged forming with the disk 31 a ball bearing 34. Owing to the ball bearing 34 the paddle is allowed to easily swing around the bolt 32 from horizontal into vertical position, and vice versa. The disk 31 at the end of the neck 30 of each paddle is provided with longitudinally projecting pins 35, 35' arranged diametrically to each other and the rear ends of said pins engage into circularly curved slots 36, 36' arranged in the opposite disk 33, whereby the swinging movement of the wings will be limited to an angle of 90°. The forward end of each of said pins serves for reversing the paddles from one position into the other as will hereinafter be fully specified. Normally, that is, when the wing is either in horizontal or vertical position, its pins 35, 35' will be located at the opposite ends in the respective slots 36, 36' as indicated by dotted lines in Fig. 8 and will be held in this position by suitable spring actuated guide pieces 39 which are secured in the frame 23 and which bear against the outer surfaces of said pins. The guide piece 39 consists of a socket 40 secured to the frame 23, in which telescopes a spring actuated tube shaped piece 41. The outer end of said piece is formed to an enlarged head piece 42 that is adapted to rest against the pin 35 or 35'.

The mechanism for reversing the position of the wings at the ends of their reciprocating movement within the horizontal sections of the frame consists of vertical adjustable bars 43, which are secured to the vertical end tubes 2 in each section and which are provided with longitudinally projecting shoulders 44 extending in the path of the reciprocating wings. When the frame 23 carrying the wings 29 approaches the end of its horizontal movement, the shoulders 44 will strike against the pins 35, 35' and swing the same towards the opposite end of the slot within the disk 34 thereby reversing the position of the paddle from horizontal into vertical position or vice versa. In each set, the wings are arranged close to one another, so that when the same are in vertical position, they form an almost uninterrupted vast surface, that in moving rapidly backward will cause a high compression of the air, whereby the apparatus will be propelled forward.

Figure 12:
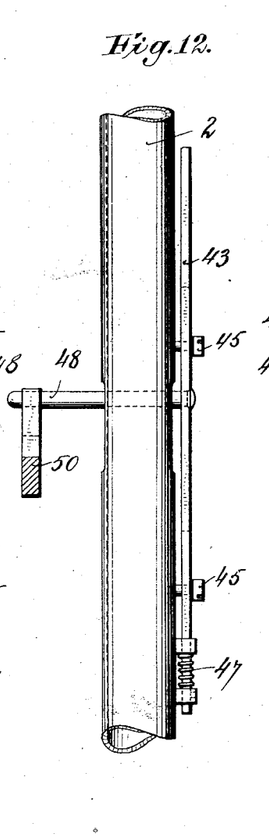
Figure 13:
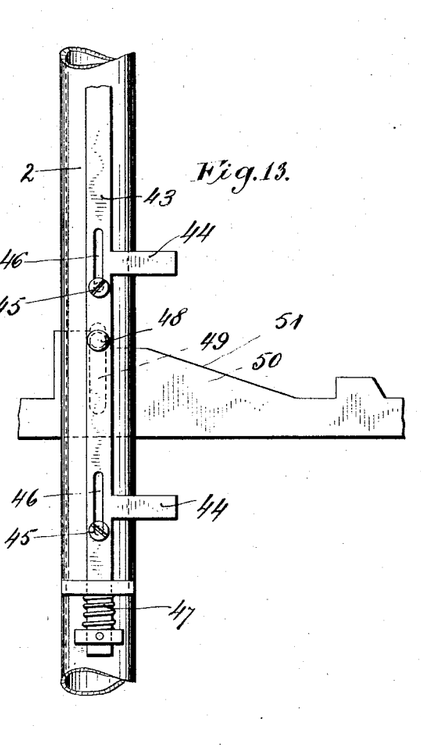

For steering the apparatus, the vertical bars 43 are, as mentioned, adjustable in vertical position and for this purpose the same are secured to the tubes 2 by pins or screws 45 that pass through vertical slots 46 in the bars. The lower ends of said bars bear against springs 47 suitably attached to the frame, which tend to throw the same into initial position. Rigidly secured to the bar 43 is a pin 48 which projects rearwards through a vertical slot 49 in the tube 2 of the frame, as shown in Fig. 12, and coöperating with said pin 48 are sliding bars 50 extending longitudinally within the sections of the frame. The upper edge of each bar 50 is formed with oblique shoulders 51 which are adapted to rest underneath the pins 48. When the bars are moved in longitudinal direction, either forward or backward, the shoulders 51 will either raise the pins 48 or permit the same to sink, raising or lowering hereby the bar 43 and its projections or fingers 44 will thus be brought to operate either the upper or lower pins 35, 35' of the reciprocating wings.

Figures 3, 4:
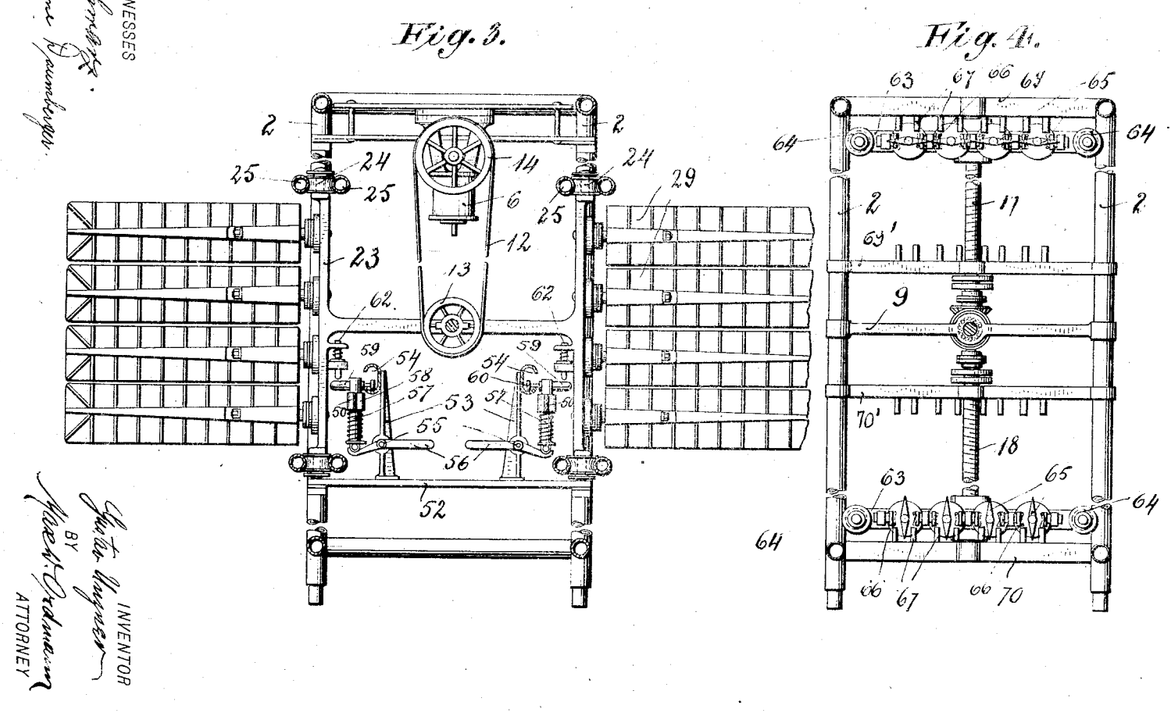
Fig. 3 a vertical cross section.
Fig. 4 an end view.
Figures 9, 10:
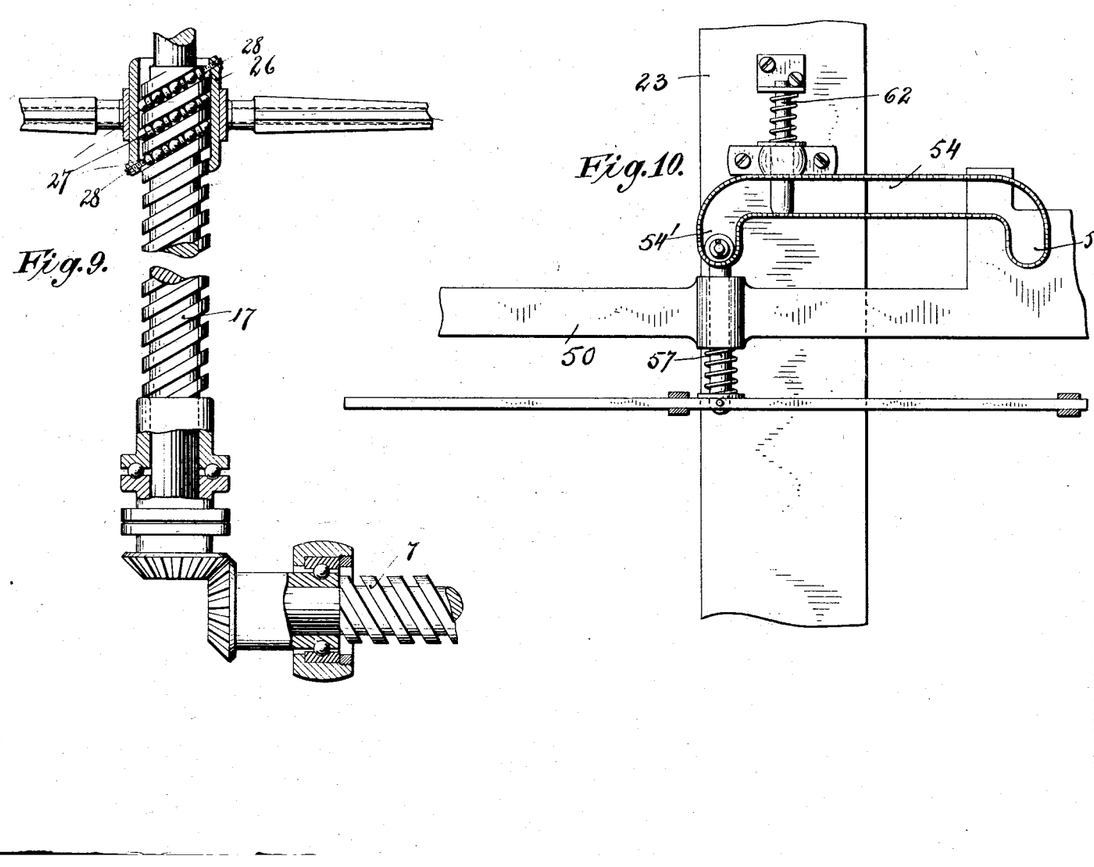
Figure 11:
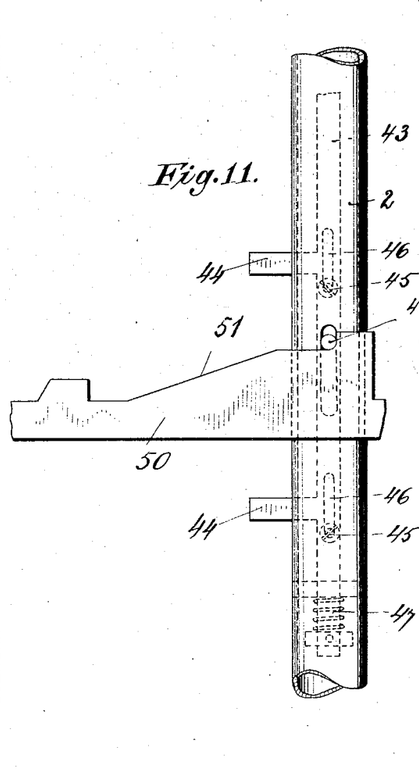

The mechanism for operating the bars 50 is constructed as follows: Suitably supported on a cross bar 52 in the frame brackets 53 are arranged brackets 55 which are formed at their upper ends with guide grooves or channels 54 that at their ends are provided with notches 54' (Figs. 3 and 10). Fulcrumed to the lower ends of said brackets at 55 are bell crank levers 56 one end of which is adapted to support a spring actuated rod 57 movably borne in a sleeve 58 arranged at a suitable point of the sliding bar 50. This rod 57 is provided with a cross arm 59 one end of which carries a guide roll 60 adapted to slide in the groove 54 and the other end forms a catch which, when the rod 57 is lifted so that the guide roll 60 is disengaged from the notch 54', will come into the path of a spring actuated pin 62 carried by the reciprocating frame 23 so as to become engaged with said pin 62 and to be carried along with the frame 23. During the longitudinal movement of the bar 50 its shoulders 51 will operate the pins 48 so as to lift or lower the bars 43 whereby the wings will be moved either from right to left or vice versa, and the apparatus accordingly steered.

At each end of the frame A in the vertical sections 15, 16, are vertically reciprocating frames 63 which are guided along the vertical side tubes 2 by means of guide rolls 64, (Fig. 4). These vertically movable frames 63 are each provided with a set of wings 65 that are of the same construction and are operated in a similar manner as the wings 29 of the horizontally movable frames 23. The latter are centrally mounted on the spindles 17, 18 by means of the above described nut consisting of the sleeve 26 and balls 27, shown in Fig. 9 whereby the frames 63 will be fed along the spindles 17, 18, when the latter are in motion.

The paddles 65 of the frame 63 are likewise capable of being reversed from the horizontal position into vertical position and vice versa, which reversion takes place at the ends of the reciprocating movement of the frames 63. The pins 66 of said paddles which correspond to the pins 35 of the horizontally reciprocating paddles are operated by fingers or shoulders 67, 67 that project inward from cross bars 69, 69', 70, 70' arranged in the vertical sections of the frame. These shoulders are arranged in the path of the pins 66 of the vertically reciprocating paddles, so that when the frames 63 reach the end position of their vertical movement, the fingers or shoulders 67 in striking against the pins 66 move the latter around an angle of 90° and thus reverse the position of the paddles. In these vertical sections, the frames 63 also move in opposite directions owing to the reversed thread of the spindles 17, 18, and while the paddles in one section are moved in horizontal position, those of the other section are moved in vertical position and vice versa.

By the rapid downward movement of the frame 63 in either of the vertical sections, the wings in horizontal position will cause a compression of the air thereby effecting the ascending movement of the apparatus. While the wings in one section will move in horizontal position, those in the other section will move in vertical position and vice versa, so that the ascending movement will not be counteracted. In the case when this propelling apparatus is applied to a balloon, the vertical spindles may be thrown out of gear with the horizontal spindles, so as to be at rest, and the wings when in horizontal position will act as a parachute preventing the balloon from sinking too rapidly.

Figure 5:
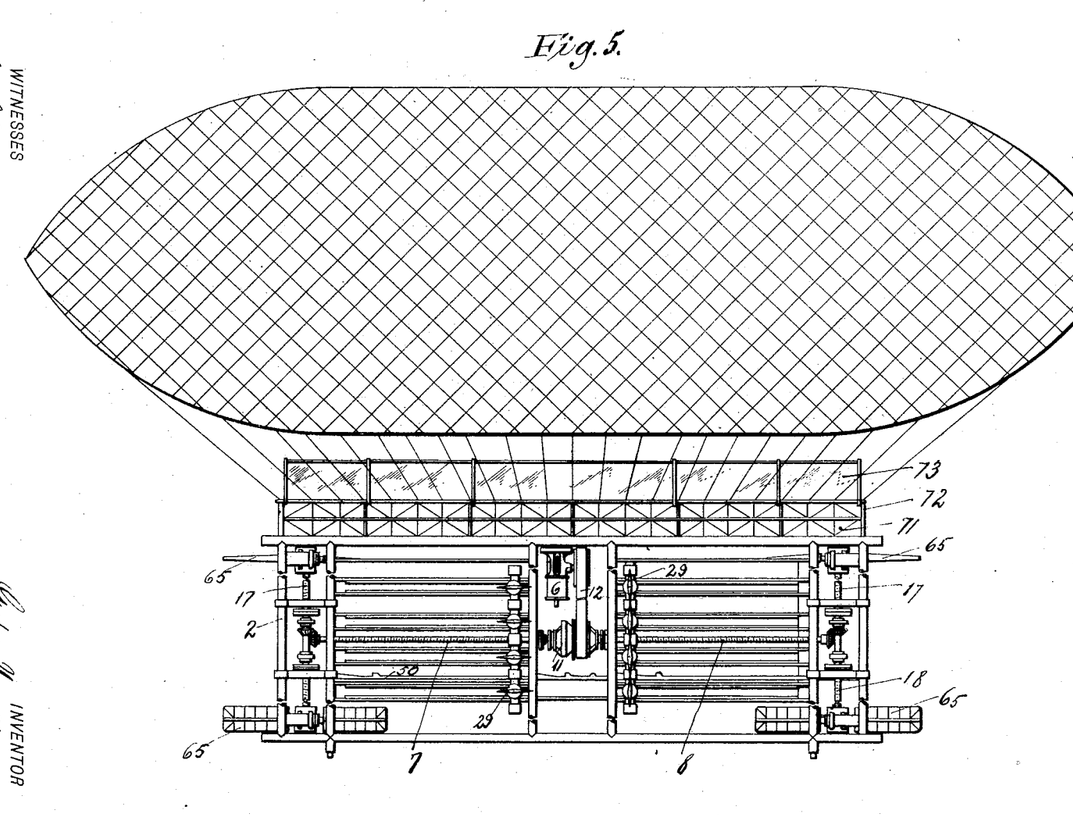
Figs. 5 and 6 illustrate the application of the apparatus to a balloon.
Figure 6:
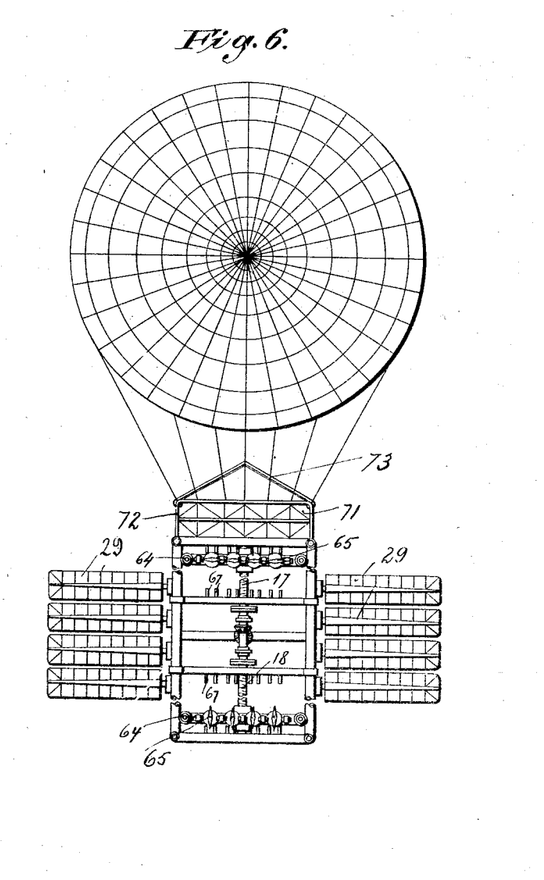
Figure 7:
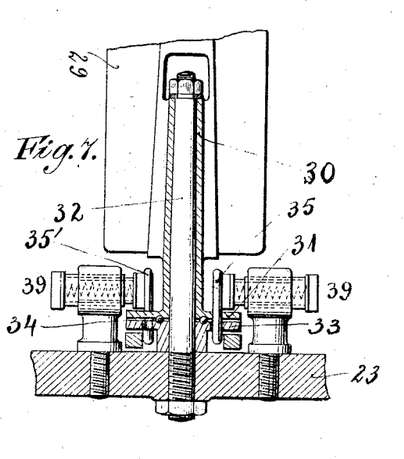

At the upper end of the frame of the apparatus, a platform 71 for passengers, with a railing 72 may be arranged, (Figs. 5, 6) over which a roof 73 of suitable material may be arranged that will not only serve to cover the passengers, but also serve as a parachute.

The operation of the sliding bars 50 for the steering of the apparatus may be attained from the platform by suitable connections (not shown) with the levers 56.

The apparatus, as described and shown, may be modified without deviating from the spirit of my invention.

What I claim and desire to secure by Letters Patent is:

1. A propelling apparatus comprising a frame divided into two horizontal sections and at each end thereof two vertical sections, vertical sets of reciprocating wings in each horizontal section, and horizontal sets of such wings in each vertical section, the wings in one horizontal section and those in one vertical section being adapted to travel in opposite directions to those of the other horizontal and vertical section respectively, each wing being capable of swinging from horizontal into vertical position and vice versa, means for imparting a reciprocating motion to said wings and means for reversing the position of said wings from vertical into horizontal position, and vice versa, substantially as and for the purpose specified.

2. A propelling apparatus comprising a frame divided into two horizontal sections, and at each end thereof two vertical sections, vertical sets of reciprocating wings in each horizontal section, and horizontal sets of reciprocating wings in each vertical section, the wings in one horizontal and one vertical section being adapted to travel in opposite directions to those of the other horizontal and vertical section respectively, each wing being capable of swinging from horizontal into vertical position and vice versa, and while the wings in one section travel in vertical position, those of the other section travel in horizontal position and vice versa, means for imparting a reciprocating motion to said wings and means for reversing the position of said wings from vertical into horizontal position, and vice versa, substantially as and for the purpose specified.

3. In a propelling apparatus, the combination with a main frame, of reciprocating frames therein, worm spindles rotatively mounted in the said main frame and carrying said reciprocating frames, of wings secured to said reciprocating frames and capable of swinging from horizontal into vertical position and vice versa, means for driving said spindles in alternate directions and means for reversing said wings from horizontal into vertical position and vice versa, substantially as and for the purpose specified.

4. In a propelling apparatus the combination with a main frame, of reciprocating frames therein, worm spindles rotatively mounted in the said main frame and carrying said reciprocating frames, sets of wings secured in the latter and capable of swinging from horizontal into vertical position and vice versa, means for allowing said reciprocating frames being fed along said spindles, means for driving the spindles in alternate directions, and means for reversing the position of the wings from horizontal into vertical position and vice versa, substantially as and for the purpose specified.

5. In a propelling apparatus, the combination with driving worm spindles, of reciprocating frames mounted on said spindles, sleeves formed in said frames to fit around said spindles and balls inclosed in said sleeves between the walls thereof and the thread, said sleeves and balls forming a nut whereby the reciprocating frames are fed along the spindles during rotation of the latter, substantially as and for the purpose specified.

6. In a propelling apparatus, the combination with a main frame, of reciprocating frames therein, wings secured in said reciprocating frames and capable of swinging from vertical into horizontal position and vice versa, said wings being arranged in a set adjacent to each other to form, when in a certain position, an almost uninterrupted surface or a single wing, which, during reciprocating movement, will cause a high compression of the air, propelling the apparatus, and which wings, in the reversed position, will be separated so as not to impair the propelling of the apparatus, substantially as and for the purpose specified.

7. In a propelling apparatus, the combination with a reciprocating frame, of wings, each wing being formed with a cylindrical sleeve, a bolt secured to the said reciprocating frame and loosely borne in said sleeve, a circular disk at the outer end of said sleeve, longitudinal pins secured in said disk, a guide disk between the latter and the reciprocating frame, said disk having circularly curved slots in which the pins are guided and forming a ball bearing with the opposite disk to allow of a swinging movement of the wing, substantially as and for the purpose specified.

8. In a propelling apparatus, the combination with a reciprocating frame, of wings, each wing being formed with a cylindrical sleeve, a bolt secured to the said reciprocating frame and loosely borne in said sleeve, a circular disk at the outer end of said sleeve, longitudinal pins secured in said disk, a guide disk between the latter and the reciprocating frame, said disk having circularly curved slots in which the pins are guided and forming a ball bearing with the opposite disk to allow of a swinging movement of the wing, and means for preventing the wing from swinging previous to reaching the ends of the reciprocating movement thereof, substantially as and for the purpose specified.

9. In a propelling apparatus, the combination with a main frame, of reciprocating frames therein, wings secured in said frame and capable of reversing their position from vertical into horizontal and vice versa, means for preventing said wings from reversing their position previous to reaching the ends of their reciprocating movement, and means for reversing the position of said wings at the ends of their reciprocating movement, substantially as and for the purpose specified.

10. In a propelling apparatus, the combination with a main frame, of reciprocating frames therein, wings secured in said frame and capable of reversing their position from vertical into horizontal and vice versa, means for preventing said wings from reversing their position previous to reaching the ends of their reciprocating movement, fingers or shoulders projecting from the frame at both ends of the path of the traveling wings and adapted to act upon the wings to reverse the same from vertical into horizontal position and vice versa, substantially as and for the purpose specified.

11. In a propelling apparatus, the combination with a main frame, of reciprocating frames therein, wings secured in said frame and capable of reversing their position from vertical into horizontal and vice versa, means for preventing said wings from reversing their position previous to reaching the ends of their reciprocating movement, adjustable vertical bars secured to the main frame, fingers or shoulders projecting from said bars at both ends of the path of the traveling wings and adapted to act upon the wings to reverse the same from vertical into horizontal position and vice versa, and means for adjusting the said bars in vertical position to permit of their fingers swinging the wings either from left to right or from right to left, to steer the apparatus, substantially as and for the purpose specified.

12. In a propelling apparatus, the combination with a main frame, of reciprocating frames therein, wings secured in said reciprocating frames and capable of reversing their position from vertical into horizontal and vice versa, pins secured to said wings, there being two pins for each wing arranged diametrically to each other, circularly curved guides for said pins, means for preventing said wings from reversing previous to reaching the ends of their reciprocating movement, fingers or shoulders projecting from the main frame at both ends of the path of the traveling wings, said fingers being adapted to act upon either of the said projecting pins to reverse the position of the wings, substantially as and for the purpose specified.

13. In a propelling apparatus, the combination with a main frame, of reciprocating frames therein, wings secured in said reciprocating frames and capable of reversing their position from vertical into horizontal and vice versa, pins secured to said wings, there being two pins for each wing arranged diametrically to each other, circularly curved guides for said pins, means for preventing said wings from reversing previous to reaching the ends of their reciprocating movement, adjustable vertical bars secured to the main frame, fingers or shoulders projecting from said bars at both ends of the path of the traveling wings, said fingers being adapted to act against one of the said pins to reverse the position of the wings, and means for adjusting the position of the bars to allow of the latter acting against the diametrically opposed pins to reverse the swinging direction of the said wings, substantially as and for the purpose specified.

14. In a propelling apparatus, the combination with a main frame, of reciprocating frames therein, wings secured in the latter and capable of reversing from vertical into horizontal position, adjustable vertical bars secured to the main frame, fingers or shoulders projecting from said bars at both ends of the path of the said traveling wings, horizontal sliding bars supported in the main frame with cam shaped projections or shoulders to operate the vertical adjustable bars, and means for imparting longitudinal movement to said sliding bars, substantially as and for the purpose specified.

Signed at New York this 1st day of July, 1907.

GUSTAV UNZNER.

Witnesses:
 MAX D. ORDMANN,
 N. F. WALSH.